United States Patent
Carney et al.

(10) Patent No.: US 6,871,285 B1
(45) Date of Patent: Mar. 22, 2005

(54) METHOD, SYSTEM AND PROGRAM FOR DETECTING COMMUNICATION CODE INFORMATION

(75) Inventors: Dennis Michael Carney, Louisville, CO (US); Charles David Johnson, Boulder, CO (US); Ryan Hoa Nguyen, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,251

(22) Filed: Jul. 7, 1999

(51) Int. Cl.[7] .................. G06F 13/00; G06F 17/00; H04L 1/22
(52) U.S. Cl. ....................... 713/202; 713/200
(58) Field of Search ................. 713/200, 201, 713/202; 700/237; 235/375, 382; 340/5.54

(56) References Cited

U.S. PATENT DOCUMENTS

| | | |
|---|---|---|
| 5,446,897 A | 8/1995 | Mathias et al. |
| 5,561,769 A | 10/1996 | Kumar et al. |
| 5,596,723 A | 1/1997 | Romohr |
| 5,602,974 A | 2/1997 | Shaw et al. |
| 5,671,414 A | 9/1997 | Nicolet |
| 5,678,044 A | 10/1997 | Pastilha et al. |
| 5,692,111 A | 11/1997 | Marbry et al. |
| 5,699,495 A | 12/1997 | Snipp |
| 5,706,508 A | 1/1998 | Chen et al. |
| 5,708,812 A | 1/1998 | Van Dyke et al. |
| 5,742,825 A | 4/1998 | Mathur et al. |
| 5,774,365 A * | 6/1998 | Ladue et al. ............. 700/237 |
| 5,774,667 A | 6/1998 | Garvey et al. |
| 5,805,572 A | 9/1998 | Bernabeu-Auban et al. |
| 5,819,112 A | 10/1998 | Kusters |
| 5,832,503 A | 11/1998 | Malik et al. |
| 5,838,918 A | 11/1998 | Prager et al. |
| 5,845,058 A | 12/1998 | Shaw et al. |
| 5,845,078 A | 12/1998 | Tezuka et al. |
| 6,047,279 A * | 4/2000 | Barrack et al. ............. 706/60 |
| 6,178,510 B1 * | 1/2001 | O'Connor et al. .......... 713/201 |

OTHER PUBLICATIONS

Jacobs, John. Windows NT Printing: Flow of Control. Microsoft TechNet, vol. 4, Issue 9, Sept. 1999 [online], [retrieved on Nov. 7, 1999]. Retrieved from the Internet <URL: http://technet.microsoft.com/cdonline/content/ complete/windows/winnt/winntas/technote/terouble-shooting . . .>.

Microsoft Corporation. Windows NT Printing Model. Microsoft Corporation, (c) 2000 [online], [retrieved on Jun. 2, 2000]. Retrieved from the Internet <URL: http://msdn.microsoft.com/library/winresource/dnwinnt/S83B1.HTM> [Available on the Internet before 12/99].

McLaughlin III, Leo J. Line Printer Daemon Protocol. Network Printing Working Group, rfc1179, Aug. 1990 [online], [Retrieved on Jun. 2, 1000].

Microsoft Corporation. Windows NT Printer Drivers. Microsoft Corporation, (c) 2000 [online], [retrievd on Jun. 2, 2000] [Available on the Internet before 12/99].

U.S. patent application Ser. No. 09/143,977, filed Aug. 31, 1998, entitled "Dynamic Network Protocol Management Information Base Options".

* cited by examiner

*Primary Examiner*—Ly V. Hua
(74) *Attorney, Agent, or Firm*—David W. Victor; Konrad Raynes & Victor LLP

(57) ABSTRACT

A method and apparatus for detecting and protecting communication code information, such as for example Simple Network Management Protocol (SNMP) community names, while still allowing the information to be changed. A search for the proper code for a device is made. However if the code cannot be determined automatically, a user is prompted to insert a code. Also, the user is allowed to change the code as needed.

33 Claims, 4 Drawing Sheets

METHOD, SYSTEM AND PROGRAM FOR DETECTING COMMUNICATION CODE INFORMATION

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, and Program for Monitoring a Device to Determine a Power Failure at the Device," to Dennis Michael Carney, having U.S. Ser. No. 09/349,056, now U.S. Pat. No. 6,487,521;

"Method, System, and Program for Establishing Network Contact," to Dennis Michael Carney and Ryan Hoa Nguyen, having U.S. Ser. No. 09/348,966, now U.S. Pat. No. 6,584,503; and "Method, System, and Program for Monitoring a Device with a Computer Using User Selected Monitoring Settings," to Dennis Michael Carney, Linda Sue Liebelt, and Ryan Hoa Nguyen, having U.S. Ser. No. 09/348,358, now U.S. Pat. No. 6,453,268.

BACKGROUND OF THE INVENTION

1. Field of the Invention

The present invention relates to a method, system and program for detecting and protecting communication code information while still allowing this information to be changed.

2. Description of the Related Art

Personal computers and workstations have become standard work tools in most office environments. To further improve the usefulness of the computer systems, most office computer systems have been linked together into an office Local Area Network (LAN). The Local Area Network allows the computer users at different computer systems to easily share information with each other. The network also allows the computer users to share computer hardware such as printers and modems. Many local area networks consist of a centralized network hub that is coupled to all the end computer systems.

This proliferation of network devices has resulted in very large and difficult-to-manage computer networks. For example, a computer network manager may be responsible for installing and maintaining numerous network hubs, network printers, network bridges, routers, gateways, file servers, and remote access servers. To simplify the task of managing all these network devices, network management systems have been devised.

To simplify the management of a large number of network devices coupled to a computer network the Simple Network Management Protocol (SNMP) was created. The Simple Network Management Protocol is a standardized protocol for sending network management commands to network devices and receiving status information from the network devices. To manage a computer network using the Simple Network Management Protocol, a network manager runs a network manager program on a workstation coupled to the network. The network manager program displays the status information received from the SNMP compatible network devices coupled to the network. To control the network devices, the network manager program sends out SNMP commands.

Using SNMP, network administrators can address queries and commands to network nodes and devices. SNMP monitors network performance and status; controls operational parameters; and reports, analyzes and isolates faults. The protocol accomplishes these functions by transporting management information between "Managers" and "Agents".

SNMP defines the following three basic components:

1. An Agent is a component housed within a managed network device such as a printer, host, gateway, or terminal server. Each Agent stores management data and responds to the Manager's requests for this data, and may send a "TRAP", a special unsolicited SNMP message, to the Manager after sensing a pre-specified condition.

2. A Manager is a component housed within a Network Management Station. The Manager queries/controls Agents using various SNMP commands.

3. A Management Information Base (MIB) is a managed object database, accessible to Agents and manipulated via SNMP for network management application.

To carry out the Agent's and Manager's duties, SNMP specifies five types of commands or verbs, called Protocol Data Units (PDUs): GetRequest, GetNextRequest, SetRequest, GetResponse and Trap. Agents inspect and retrieve the management data after receiving either a GetRequest or a GetNextRequest PDU from a Manager. Managers use GetRequest for retrieving single values of the managed objects. The GetNextRequest is issued by the Manager to begin a primitive block transfer and the Agent returns the selected data with a GetResponse verb. Managers use SetRequest commands for instructing Agents to alter MIB variables while Traps are unsolicited messages sent by Agents to Managers after sensing pre-specified conditions.

SNMP is advantageous as a communication protocol because neither the Agent nor Manager rely on the other to continue operating. Thus, one may fail, and the other would carry on. SNMP further does not require the establishment of a communication path prior to the transmission of data. As a result, with SNMP, there is no guarantee that a transmission was received. Although most messages do transmit successfully, those that do not cannot be re-transmitted. On the other hand, SNMP's simplicity and connectionless communication also produce a degree of robustness. Neither the Manager nor the Agent relies on the other for its operation.

A primary protocol used by SNMP for communication is the User Datagram Protocol (UDP). Under UDP, a session is not established before the transmission of data (that is, there is no three-way handshake, as used with transmission control protocol, (TCP)). This means that a logon with a user ID and password is not performed prior to transmission of data. This can be considered a security hole because the software that is receiving a datagram has no way to verify the identity of the software that sent the datagram.

SNMP does however provide a simple form of security by utilizing what is known as a community. During installation of the Manager and Agent software, the installer enters one or more community names. For example a community name could be the word public. The network management software is then configured to only accept datagrams from or send datagrams to specific communities. In addition to the community names, the network software can be configured to only allow the receipt of datagrams from specific IP addresses. Agents are configured with the IP addresses of network Managers to which they can send unsolicited messages.

Thus in order to communicate with a device, such as a printer, using SNMP, an application must use some SNMP community name. Most applications use either the community name "public" or ask the user to provide a community name. However, there are problems associated with this.

First, "public" often does not have write privileges. Certain SNMP commands, such as SetRequest, require data to be written on the MIB associated with the managed device. With some applications, the "public" community name will not permit this data to be written on the MIB.

A second problem is that many devices do not support the "public" community name at all, and thus would not be able to communicate.

Asking the user to provide the community name often does not help, since many users are not system administrators and thus do not know the proper community name to use in order to communicate with a particular device.

Another problem associated with the use of community names is that they are used by some system administrators in a way similar to passwords, keeping them secret from even the other users of the network. These administrators disable the community names installed in the managed devices by the manufacturers and insert their own "secret" community name for the network in question. However because applications typically display the community names, the ability to retain their secrecy is usually not effective.

Thus it would be desirable for Manager applications, such as for example, printer port monitor applications, to have the capability of automatically detecting community names. Moreover it would be desirable that such applications have the capability of accepting and using community names without disclosing them to users.

SUMMARY OF THE PREFERRED EMBODIMENTS

To overcome the limitations in the prior art described above, preferred embodiments disclose a system, method and program for detecting and protecting communication information while still allowing this information to be changed. A group or list of codes is provided. A determination is made automatically from the group of provided codes as to whether one of the codes permits communication with a device. If one of the provided codes permits communication, that code is used in configuring the system for communications with the device.

In further embodiments, user input is received of a user defined code if it is determined that no provided code permits communication with the device. A determination is made as to whether the user defined code permits communication with a device, and if so, that user defined code is used in configuring the system for communications.

In still further embodiments, user input of a user defined code is permitted even if an acceptable provided code was automatically found. A determination is made as to whether the user defined code permits communication with the device; and if so, that user defined code is used in configuring the system for communications.

In further embodiments, a determination is made automatically from the group of provided codes as to whether one of the codes permits read/write access to a device. If no such code is found, then a second determination is made automatically as to whether one of provided codes permits read-only access to the device. The system is configured preferentially to use a read/write access code and secondarily to use a read-only access code.

In still further embodiments, a display screen is provided for the codes which includes a password protected field for entering the codes.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
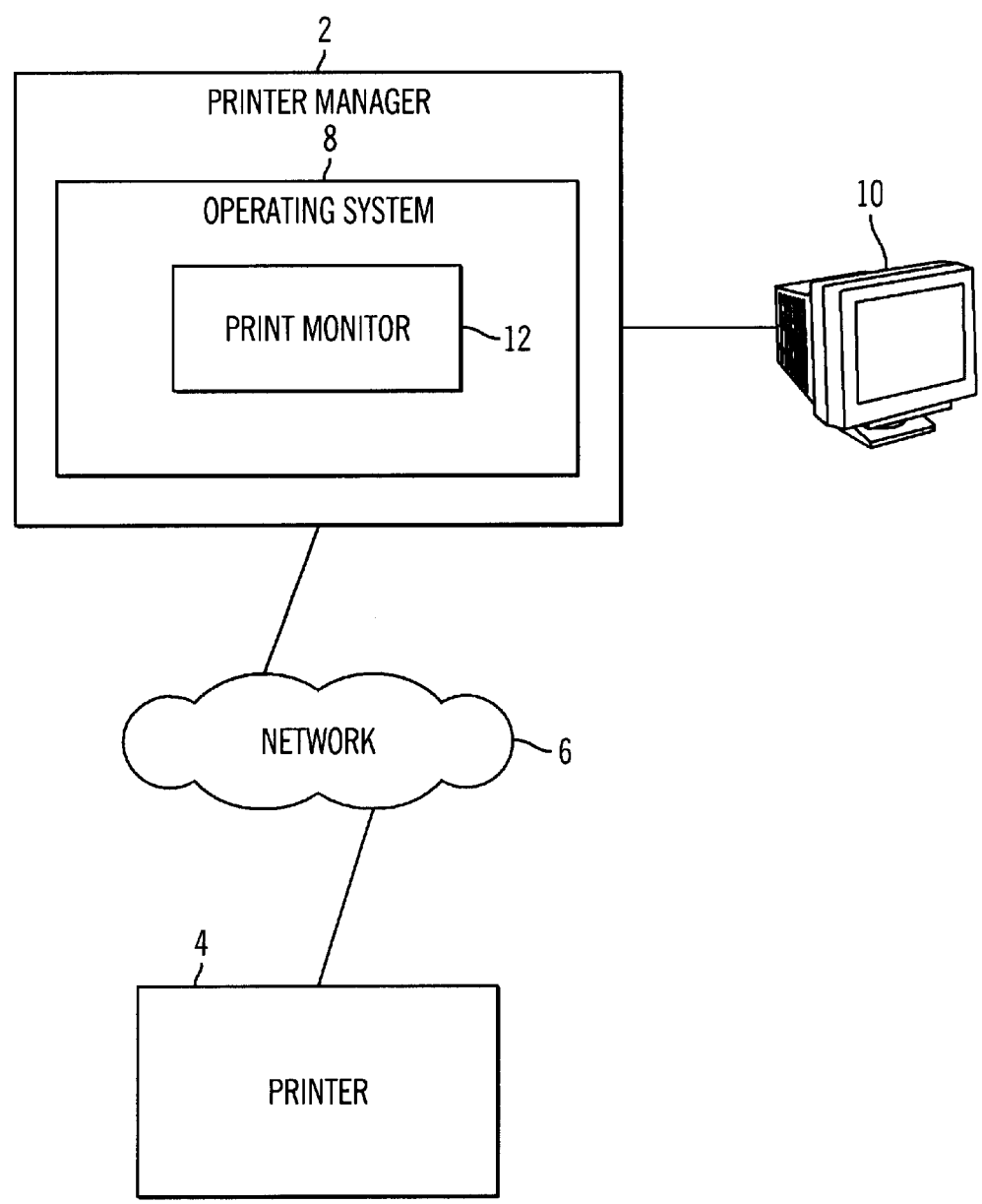
FIG. 1 is a block diagram illustrating a software and hardware environment in which preferred embodiments of the present invention are implemented.

FIG. 1 illustrates a computing environment in which preferred embodiments of the present invention are implemented. A printer manager 2 is in communication with a printer 4 via a network 6. The network 6 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the printer manager 2 and the printer 6.

The printer manager 2 is preferably comprised of a computer, either a client or server, that manages printer operations over a network, such as performing spooling and queuing for print jobs. The computer 2 may be any computer device known in the art, such as a desktop computer, laptop computer, workstation, mainframe, server, personal digital assistant (PDA), etc. The computer 2 would include an operating system 8 such as AIX, OS/390, UNIX, OS/2, MVS, WINDOWS NT, 95/98, LINUX, etc. The printer manager 2 may also include software to allow a network administrator or user to manage network printers, such as the IBM Network Printer Manager software solutions to submit and monitor print jobs, and perform other network printer manager functions, Attached to the printer manager 2 is a display monitor 10, which may be comprised of any computer display device known in the art. An input device (not shown) would also be provided with the printer manager 2 to allow a systems administrator or other user to enter data into the printer manager 2. This input device may be comprised of any input means known in the art, including a mouse, keyboard, touch screen display, voice activated input, electronic pen, etc.

The printer 4 may be any printer, plotter, three dimensional model builder or other similar output device known in the art. In preferred embodiments, the printer manager 2 and printer 4 includes include a network card and one or more ports for intercommunication over the network 6.

In preferred embodiments, the printer manager 2 and printer 4 may communicate using the Simple Network Management Protocol (SNMP), or any other suitable network protocol known in the art, such as TCP/IP, LPR, etc. The SNMP protocol is described in Request for Comments No. 1157 (May 1990), entitled "A Simple Network Management Protocol (SNMP)," and No. 1759 (March 1995), entitled "Printer MIB," which documents are incorporated herein by reference in their entirety. The SNMP protocol provides for the interoperability of different devices communicating over a TCP/IP network, such as the Internet.

In preferred embodiments, the printer manager 2 would communicate with the printer 4 via a port, and monitor that port for printer communications. Likewise, the printer 4 would dedicate a port for communicating with the printer manager 2 in a manner known in the art, such as the SNMP art.

The printer manager 2 further includes a printer monitor program 12 component which is used to communicate with the printer 4, and perform operations such as sending print jobs to the printer and monitoring printer status. The printer monitor 12 would incorporate the communication protocol, such as SNMP, to communicate directly with the printer 4 to perform the printer manager functions.

Setting SNMP Community Information

In preferred embodiments, a search is automatically conducted for the proper SNMP community name for the managed device in question, such as a printer. However if the community name cannot be determined by this search, a user or network administrator is prompted to insert a community name. Also, the user or network administrator is allowed to change the community name as needed.

The preferred embodiment accomplishes this by using a set of known, provided community names, at least one of which is likely to be acceptable for successfully establishing communications. These provided names are based upon manufacturer supplied community names which are known to ship with the managed devices. The application attempts to establish communication with the managed device by trying each of the provided names. If the first name fails, the application will try the next provided name, and will continue down the list until communication is established or until all provided names have been tried. In the event that the provided names do not succeed, the application will request the user to supply the correct name.

In another embodiment, if the application finds a community name that does work, but only has read-only privileges, then it continues through the list of names, looking for one that has read/write privileges. If no name is found with read/write privileges, then the application will use a name which has read-only privileges.

In another embodiment, the user is given the option of changing the community name. Thus the application will provide a graphical user interface (GUI) which includes an entry field for the community name to be used. However, should the user enter a name which does not work, then the application will search its list of provided names and attempt to establish communications with one from the list. If a provided name does work, then the application will use that name and not the name given by the user.

In another embodiment, the application provides a GUI which includes a community name entry field which is password protected. The entry field is treated as if it were a password, displaying it as asterisks ("\*\*\*\*\*\*\*\*") before typing, and displaying an asterisk ("\*") for each character typed in the field.

This feature is useful for system administrators who want to use community names in a way similar to passwords. These administrators disable the community names shipped with the managed device and establish a new "secret" community name which serves as a sort of password for the device. The administrators could then type the new community name into any application that needed to communicate with the device in question. By using the password protected fields, administrators could type in the "secret" community name, yet the other users of the application would not be able to see the new name afterwards. In this way, the application itself does not disclose the "secret" community name.

Write access is intended in general for system administrators. Even if a write access community name is known in the industry, it is unlikely that end users who are not system administrators would know the name. Thus if an end user tried to use a generic MIB browser to change values in a MIB, he would not know which community name to use. However any application that did not use password protection on the community name would divulge the name to the end user. In another words, even community names which are known in the industry can provide some level of security against malevolent writers. But this security is lessened by applications that do not use password protection for their community name entry field.

A password protected entry field can serve to eliminate confusion. As previously mentioned, a preferred embodiment allows the user to change a community name, and if that name does not work, the application will try other names from its list of provided names. If successful, the provided name will be used rather than the name supplied by the user. However if the user entered one name, and the application ended up using a second name because the second name was the one which worked, it would be confusing for the user to see the second name in the entry field after instructing the application to use the first community name. Password protecting this field will prevent this confusion, while providing the user with continued communication with the managed device.

Figure 2:
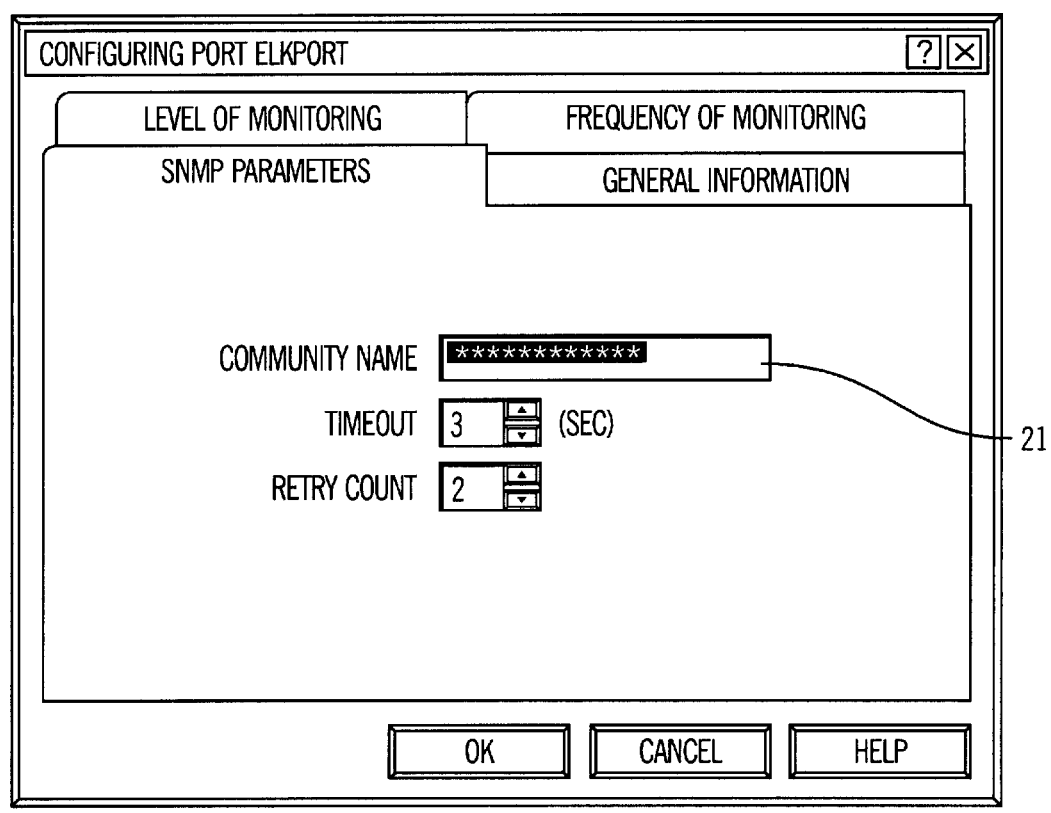
FIG. 2 illustrates a display on a computer monitor in accordance with preferred embodiments of the present invention.

FIG. 2 illustrates a GUI panel displayed on monitor 10 in which the user may enter or change a community name. Community name field 21 is password protected. The entry field is treated as a password, displaying it as asterisks ("\*\*\*\*\*\*\*\*") before typing, and displaying an asterisk ("\*") for each character typed in the field. However, it must be appreciated that the display need not be limited to asterisks. Any other character or blank space could be employed in alternative embodiments.

Figure 3A:
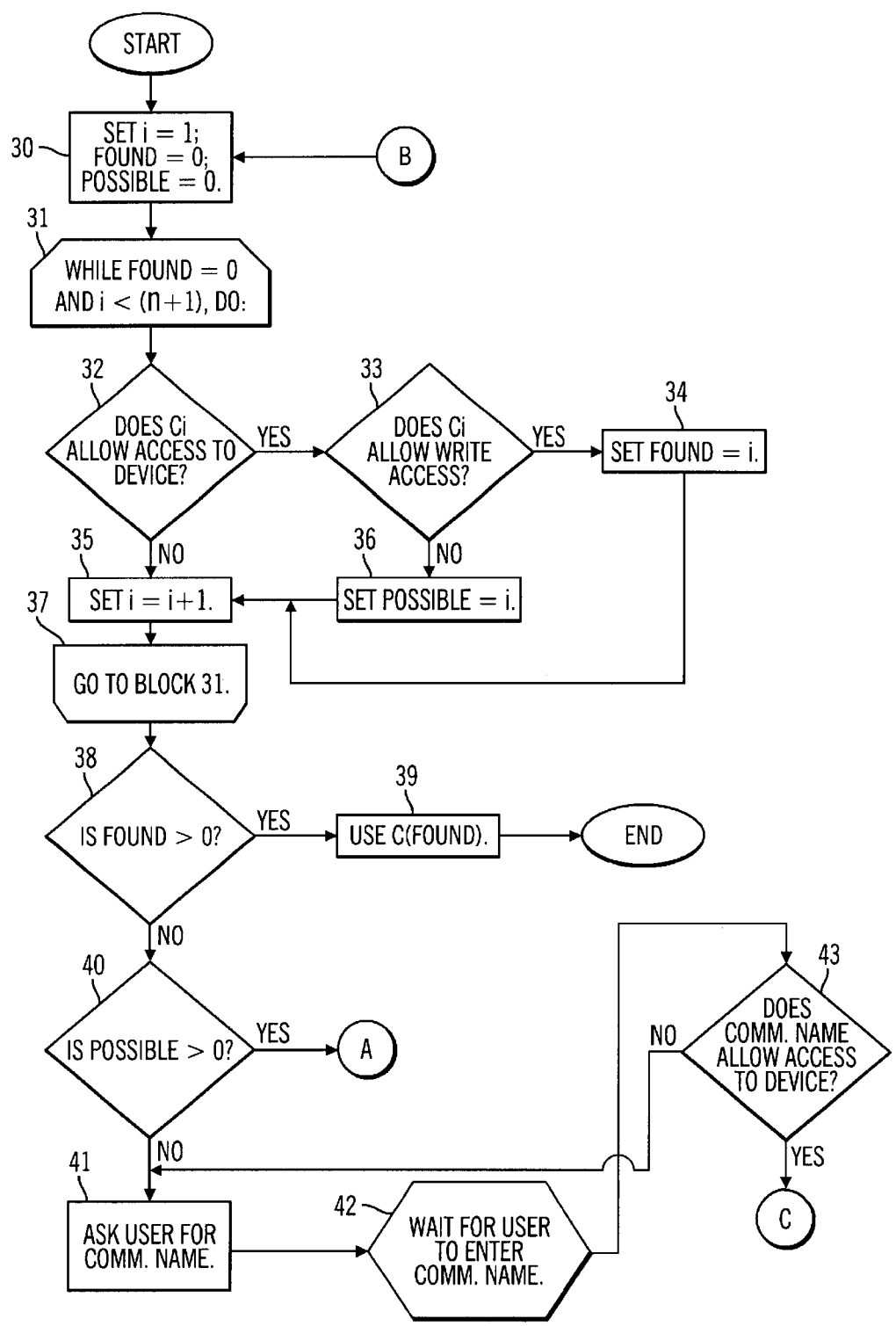
FIGS. 3a and 3b illustrate logic for automatically determining a community name in accordance with preferred embodiments of the present invention.
Figure 3B:
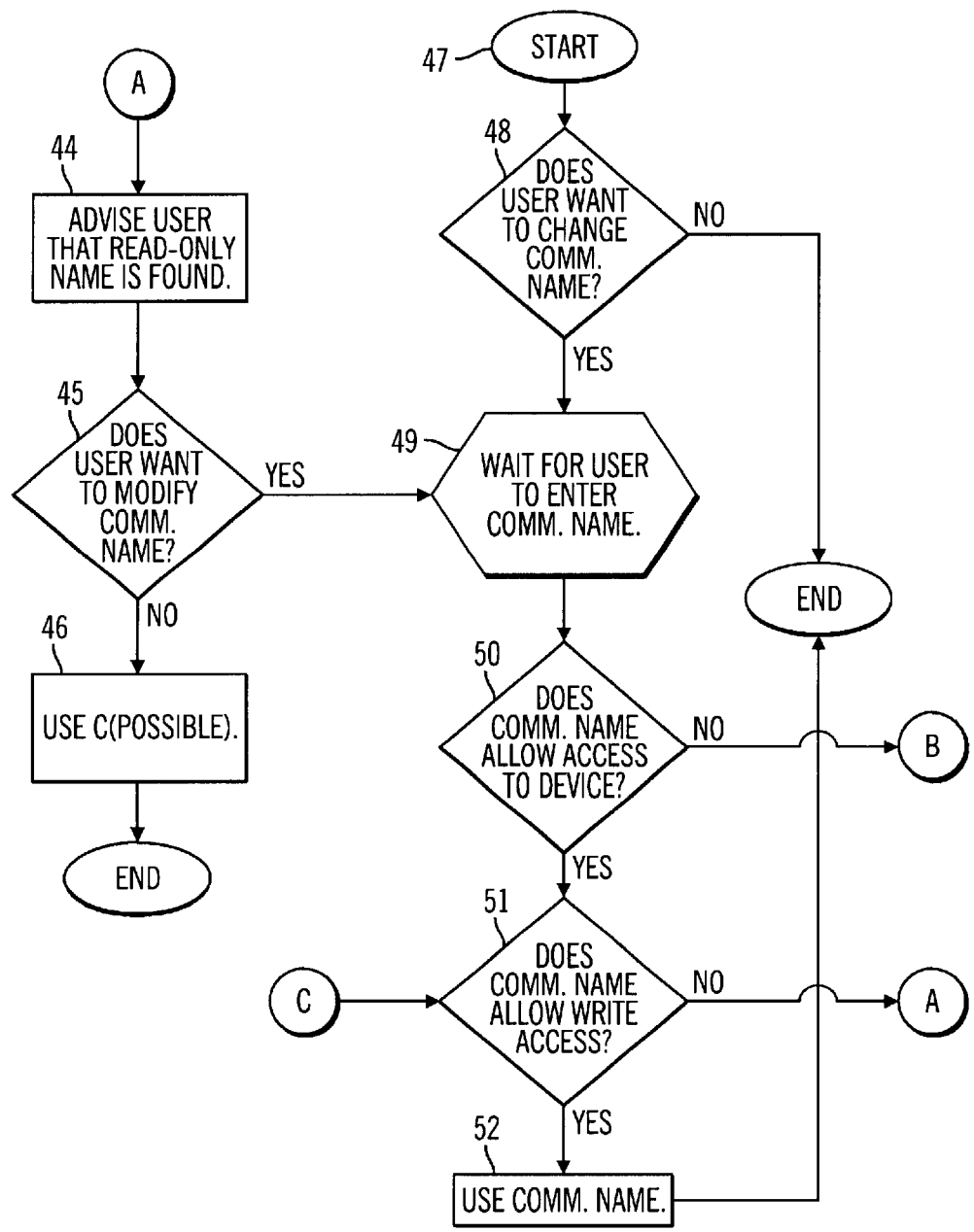

FIGS. 3a and 3b illustrate logic implemented in print monitor application 12 for automatically detecting an acceptable community name with read/write privileges from a group of provided community names. If there are no acceptable community names with read/write privileges, then a community name with read-only privileges is sought. Then if there are none of those, the application solicits user input for a user-supplied community name. Finally, even if an acceptable community name is found from the group of provided community names, the user may later change the community name.

In FIG. 3a the letter "n" (block 31) corresponds to the number of different provided community names which are supplied with the application. Many applications are provided by manufacturers of managed devices, such as network capable printers. For example in the preferred embodiment, a printer monitor application would be provided by the manufacturer of computer printers. That manufacturer would ship printers with one or more community names pre-installed. Thus that same manufacturer would have knowledge of and be able to include in its print monitor application a list of all provided community names associated with all of its printers.

Control begins at block 30 where counter "i" is set to 1 and counters "found" and "possible" are set to 0. Blocks 31 through 37 constitute a loop for selectively trying the provided community names which were supplied by the manufacturer and determining whether one will permit read/write access to a device, such as a printer. If no read/write community name is present, then this loop will identify a community name, if any, which permits read-only access.

With counter "i" set to 1, block 32 determines whether the first community name, C1, allows access to the device. If it does, then it is known that C1 at least permits read-only access. Next, a determination is made as to whether C1 permits write access. (Block 33) If it does, then an acceptable community name has been located. Counter "found" is set to 1 (block 34) and control shifts to block 35. Counter "i" is incremented by 1 (block 35) and control transfers to block 37. Because counter "found" is no longer equal to zero, control transfers from the previously-described loop to block 38. Since counter "found" is now greater than 0, control shifts to block 39 where application 12 is configured to use community name C(found) which is the same as C1. The application ends at this point since an acceptable, provided community name has been found. However the user has the option at any time thereafter to enter a different community name. This process is depicted starting at block 47 (FIG. 3b) which will be described later.

Returning to block 33, if on the other hand C1 does not allow write access, then it is known that C1 merely permits read-only access. Control shifts to block 36 where counter "possible" is set to 1 and then to block 35 where counter "i" is incremented up by 1. Control then loops to block 31 where the above described process is repeated.

Returning to block 32, if on the other hand it was determined that community name C1 does not allow any access to the device, then control shifts to block 35 where counter "i" is incremented by 1. Control then loops to block 31 where the above described process is repeated.

Thus it can be appreciated that this loop will continue until one of two events occur: If counter "found" no longer equals 0, then a community name with read/write access has been found and the loop will discontinue. If counter "i" is no longer less than (n+1), then all n of the community names which were supplied by the manufacturer have been tested, and the loop will discontinue.

Turning to block 38, if counter "found" is not greater than 0, then this indicates that a community name with read/write privileges was not found after trying all provided community names. Control will therefore transfer to block 40 where it is determined whether counter "possible" is greater than 0. If it is greater than 0, this indicates that one of the provided community names has read-only privileges. In such event, control transfers to block 44 (FIG. 3b) where the user is advised that a read-only name has been found.

The user is given the option of modifying the read-only community name. (Block 45). If the user does not want to modify the read-only community name, then control transfers to block 46 where application 12 is configured to use the provided community name, C(possible), and the application terminates. As before, however, the user has the option at any time thereafter to enter a different community name. This process is depicted starting at block 47 which will be described later.

Returning to block 45, if on the other hand the user did desire to modify the provided, read-only community name, then control transfers to block 49 where the application would wait for the user to enter a community name. Upon entering a name, a determination is made as to whether it allows access to the device. (Block 50). If it does, then it is known that the community name at least permits read-only access.

Next a determination is made as to whether the community name permits write access. (Block 51) If it does, then application 12 is configured to use the user-provided community name (block 52) and the application is terminated. If at block 50 it was determined that the user-provided community name did not allow access to the device, then control would loop to block 30 (FIG. 3a) where the previously described automatic discovery process would be repeated. If at block 51 it was determined that the community name does not allow write access, then it is known that the community name merely permits read-only access. Control shifts to block 44 where the previously described process is repeated.

Returning to block 40 (FIG. 3a), if on the other hand counter "possible" is not greater than 0, then this indicates that none of the provided community names has either read/write or read-only privileges. In this event, the user is requested to enter a community name. (Block 41) The application waits for the user to enter a community name (block 42) and then tests to see if the user-supplied community name allows access to the device. (Block 43). If access is allowed, then it is known that the community name at least permits read-only access. Control transfers to block 51 where the previously described process is repeated.

Returning to block 43, if access is not allowed, control is returned to block 41 where the user is again asked for a community name and the previously described process is repeated.

At any later point in time, the preferred embodiment gives the user the option of changing the community name. This may be necessary should the community names on the device be altered, or for any number of other reasons.

Blocks 47 and 48 (FIG. 3b) represent the starting point for the logic flow for those instances when the user optionally wants to change the community name. Control transfers to block 49 where the application waits for the user to enter the name and the previously described process is repeated.

As is apparent from the logic of FIGS. 3a and 3b, if one of the provided names works, then application 12 will be configured to use it notwithstanding the entry by the user of a changed community name which did not work. Thus it can be appreciated that since the preferred embodiment includes a password protected community name display such as that depicted in FIG. 2, a user who enters a changed community name that does not work, will not be aware that application 12 ends up being configured with a stored community name which does work. This will help avoid user confusion which might otherwise exist for a user who enters one community name, yet observes a different community name in use on a GUI display screen without a password protected name display.

In summary, the logic of FIGS. 3a and 3b attempts to automatically discover a community name with read/write privileges. Failing that, it will use a default community name with read-only privileges if such a name can be found. As before, the user always has the option of changing a community name. However, if the name inserted by the user does not work and if there is a provided name which does work, then the application will use the provided name and ignore the name inserted by the user.

FIGS. 3a and 3b represent the logic of an application which preferentially uses a community name with read/write privileges over a community name with read-only privileges. However an alternative embodiment consists of an application which does not distinguish between community names with read/write and read-only privileges. Such an embodiment involves simpler logic than that depicted in FIGS. 3a and 3b and would test for a community name among the supplied names which allow any access to the managed device.

Conclusions and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, or a file server providing access to the programs via a network transmission line, holographic unit, etc. Of course, those skilled in the art will recognize many modifications may be made to this configuration without departing from the scope of the present invention.

Preferred embodiments were described with respect to printers as the managed devices. However, the inventions claimed herein apply to any aspect of any type of device attached to the network or computer, where the computer functions as the managing device and the managed object may be any device known in the art capable of connecting to the computer directly, e.g., a parallel port or serial port, or through a network, such as an intranet or the Internet.

The GUI panel in FIG. 2 is for illustrative purposes. Graphical design elements and GUI functions may be added and removed without departing from the invention. Moreover, GUI displays are not required at all. Alternative embodiments could include any sort of input means or display whereby the user is prompted to insert a community name.

The logic of FIGS. 3a and 3b is preferably implemented within the printer monitor application. However, various functions may be implemented in different application programs involving the management of or communication with network devices. This logic is for illustrative purposes. Additional or alternative steps may be performed in addition to those illustrated in the logic. Further, the order of the steps in the preferred logic may also vary.

Preferred embodiments were described in connection with community names as used in the SNMP protocol. However, the inventions claimed herein include any aspect of electronic communications between devices wherein a code or a password of any kind is necessary to allow communications.

In preferred embodiments, the printer monitor application 12 is implemented in an object oriented design program such as JAVA, C++, or non-object oriented languages, such as Basic, Pascal, FORTRAN, etc.**

**AIX and OS/2 are registered trademarks of IBM and OS/390 and MVS are trademarks of IBM; WINDOWS is a registered trademark of Microsoft Corporation; UNIX is a registered trademark licensed by the X/Open Company LTD; JAVA is a trademark of Sun Microsystems, Inc.; Linux is a trademark of Linus Torvalds.

Preferred embodiments were described as implemented in a network printing system with respect to managing the operations of printer devices. However, the embodiments of the present invention may be applied to any network system in which a computer monitors and communicates with one or more attached components. The preferred embodiments are not limited to monitoring and managing only printers and related output devices. For instance, preferred embodiments could apply to communicating with facsimile machines, copiers, telephones, display devices, input/output devices, storage devices, communication systems, routers, brouters, switches etc., in communication with the network system.

In summary, preferred embodiments disclose a method, system, and program for automatically determining community names from a list of provided names for a computer to manage and communicate with a managed device. Failing that, it will request the user to enter a community name. The user also has the option of changing a community name. However, if the name inserted by the user does not work and if there is a provided name which does work, then the application will use the provided name and will ignore the name inserted by the user. Optionally, the community name field displayed on the monitor is a password protected field.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method of determining a code to use to communicate with a device, comprising:

providing at least two codes;

determining whether a first code permits a first or second type of communication with the device;

determining whether a second code permits the first or second type of communication with the device in response to determining that the first code does not permit the first type of communication with the device;

using the first code to perform the first type of communication with the device in response to determining that the first code permits the first type of communication with the device;

using the second code to perform the first type of communication with the device in response to determining that the second code permits the first type of communication with the device; and using one of the first code and second code that permit the second type of communication to perform the second type of communication with the device in response to determining that neither the first code nor second code permit the first type of communication.

2. The method as claimed in claim 1 further comprising:

receiving user input of a user code after determining that the first and second codes do not permit the first type of communication;

determining whether the user code permits the first type of communication with the device; and using the user code to communicate with the device after determining that the user code permits the first type of communication with the device.

3. The method as claimed in claim 2 further comprising:
using the first code to communicate with the device in response to determining that the first code permits the second type communication with the device and in response to determining that the user code does not permit the first type of communication with the device; and
using the second code to communicate with the device after determining that the second code permits the second type of communication with the device and in response to determining that the first code does not permit the second type of communication with the device and the user code does not permit the first type of communication with the device.

4. The method as claimed in claim 2 further comprising displaying a password protected field for codes.

5. The method as claimed in claim 1 wherein the provided codes for communicating with the device comprise SNMP community names.

6. The method of claim 1, further comprising:
requesting user input of a user code in response to determining that the first and second codes do not permit the first type of communication and permit the second type of communication; and
using one of the first and second codes that permit the second type of communication to communicate with the device in response to receiving user input indicating that no user code will be provided.

7. The method of claim 1, further comprising:
requesting user input of a user code in response to determining that the first and second codes do not permit the first type of communication and at least one of the first and second codes permit the second type of communication;
receiving the user code in the user input;
using the user code to perform the first type of communication with the device in response to determining that the user code permits the first type of communication.

8. The method of claim 7, further comprising:
requesting user input of an additional user code in response to determining that a previously received user code does not permit the first type of communication.

9. The method of claim 7, further comprising:
indicating to the user that located codes only permit the second type of communication when requesting the user input of the user code.

10. The method of claim 1, further comprising:
requesting user input of a user code in response to determining that both the first and second codes do not permit the first type of communication and at least one of the first and second codes permit the second type of communication;
receiving user input indicating no user code; and
using one of the first and second codes that permits the second type of communication to perform the second type of communication with the device in response to receiving the user input indicating no user code.

11. The method of claim 1, wherein the first type of communication comprises read and write access to the device and wherein the second type of communication comprises read-only access to the device.

12. A system for determining a code to use to communicate with a device, comprising:
means for providing at least two codes;
means for determining whether a first code permits a first or second type of communication with the device;
means for determining whether a second code permits the first or second type of communication with the device in response to determining that the first code does not permit the first type of communication with the device;
means for using the first code to communicate with the device in response to determining that the first code permits the first type of communication with the device;
means for using the second code to communicate with the device in response to determining that the second code permits the first type of communication with the device; and
means for using one of the first code and second code that permit the second type of communication to perform the second type of communication with the device in response to determining that neither the first code nor second code permit the first type of communication.

13. The system as claimed in claim 12 wherein the program logic further comprises:
means for receiving user input of a user code after determining that the first and second codes do not permit the first type of communication;
means for determining whether the user code permits the first type of communication with the device; and
means for using the user code to communicate with the device after determining that the user code permits the first type of communication with the device.

14. The system as claimed in claim 13 wherein the program logic further comprises:
means for using the first code to communicate with the device in response to determining that the first code permits the second type of communication with the device and in response to determining that the user code does not permit the first type of communication with the device; and
means for using the second code to communicate with the device in response to determining that the second code permits the second type of communication with the device and determining that the first code does not permit the second type of communication with the device and the user code does not permit the first type of communication with the device.

15. The system as claimed in claim 13 wherein the program logic further comprises means for displaying a password protected field for codes.

16. The system as claimed in claim 12 wherein the provided codes for communicating with the device comprise SNMP community names.

17. The system of claim 12, further comprising:
means for requesting user input of a user code in response to determining that the first and second codes do not permit the first type of communication and permit the second type of communication; and
means for using one of the first and second codes that permit the second type of communication to communicate with the device in response to receiving user input indicating that no user code will be provided.

18. The system of claim 12, further comprising:
means for requesting user input of a user code in response to determining that the first and second codes do not permit the first type of communication and at least one of the first and second codes permit the second type of communication;
means for receiving the user code in the user input; and
means using the user code to perform the first type of communication with the device in response to determining that the user code permits the first type of communication.

19. The system of claim 18, further comprising:
means for requesting user input of an additional user code in response to determining that a previously received user code does not permit the first type of communication.

20. The system of claim 18, further comprising:
means for indicating to the user that located codes only permit the second type of communication when requesting the user input of the user code.

21. The system of claim 12, further comprising:
means for requesting user input of a user code in response to determining that both the first and second codes do not permit the first type of communication and at least one of the first and second codes permit the second type of communication;
means for receiving user input indicating no user code; and
means for using one of the first and second codes that permits the second type of communication to perform the second type of communication with the device in response to receiving the user input indicating no user code.

22. The system of claim 12, wherein the first type of communication comprises read and write access to the device and wherein the second type of communication comprises read-only access to the device.

23. An article of manufacture for use in determining a code to use to communicate with a device, the article of manufacture comprising computer usable media including at least one computer program embedded therein that causes the computer to perform:
providing at least two codes;
determining whether a first code permits a first or second type of communication with the device;
determining whether a second code permits a first or second type of communication with the device in response to determining that the first code does not permit the first type of communication with the device;
using the first code to perform the first type of communication with the device in response to determining that the first code permits the first type of communication with the device;
using the second code to perform the first type of communication with the device in response to determining that the second code permits communication with the device; and
using one of the first code and second code that permit the second type of communication to perform the second type of communication with the device in response to determining that neither the first code nor second code permit the first type of communication.

24. The article of manufacture of claim 23 further comprising:
receiving user input of a user code after determining that the first and second codes do not permit the first type of communication;
determining whether the user code permits the first type of communication with the device; and
using the user code to communicate with the device after determining that the user code permits the first type of communication with the device.

25. The article of manufacture of claim 24 further comprising:
using the first code to communicate with the device in response to determining that the first code permits the second type of communication with the device and that the user code does not permit the first type of communication with the device; and
using the second code to communicate with the device after determining that the second code permits the second type of communication with the device and in response to determining that the first code does not permit the second type of communication with the device and the user code does not permit the first type of communication with the device.

26. The article of manufacture of claim 24 further comprising displaying a password protected field for codes.

27. The article of manufacture of claim 23 wherein the provided codes for communicating with the device comprise SNMP community names.

28. The article of manufacture of claim 23, further comprising:
requesting user input of a user code in response to determining that the first and second codes do not permit the first type of communication and permit the second type of communication; and
using one of the first and second codes that permit the second type of communication to communicate with the device in response to receiving user input indicating that no user code will be provided.

29. The article of manufacture of claim 23, further comprising:
requesting user input of a user code in response to determining that the first and second codes do not permit the first type of communication and at least one of the first and second codes permit the second type of communication;
receiving the user code in the user input; and
using the user code to perform the first type of communication with the device in response to determining that the user code permits the first type of communication.

30. The article of manufacture of claim 29, further comprising:
requesting user input of an additional user code in response to determining that a previously received user code does not permit the first type of communication.

31. The article of manufacture of claim 29, further comprising:
indicating to the user that located codes only permit the second type of communication when requesting the user input of the user code.

32. The article of manufacture of claim 23, further comprising:
requesting user input of a user code in response to determining that both the first and second codes do not permit the first type of communication and at least one of the first and second codes permit the second type of communication;
receiving user input indicating no user code; and
using one of the first and second codes that permits the second type of communication to perform the second type of communication with the device in response to receiving the user input indicating no user code.

33. The article of manufacture of claim 23, wherein the first type of communication comprises read and write access to the device and wherein the second type of communication comprises read-only access to the device.

* * * * *